| (12) | United States Patent | (10) Patent No.: | US 8,789,671 B2 |
|---|---|---|---|
| | Chevalier | (45) Date of Patent: | Jul. 29, 2014 |

(54) MULTIPLE OUTPUT TRANSMISSION SYSTEMS

(75) Inventor: John Phillip Chevalier, London (GB)

(73) Assignee: John Phillip Chevalier (GB)

( * ) Notice: Subject to any disclaimer, the term of this patent is extended or adjusted under 35 U.S.C. 154(b) by 465 days.

(21) Appl. No.: 13/139,232

(22) PCT Filed: Nov. 13, 2009

(86) PCT No.: PCT/GB2009/002665
§ 371 (c)(1),
(2), (4) Date: Nov. 13, 2009

(87) PCT Pub. No.: WO2010/058151
PCT Pub. Date: May 27, 2010

(65) Prior Publication Data
US 2011/0278125 A1    Nov. 17, 2011

(30) Foreign Application Priority Data

Nov. 21, 2008 (GB) .................................. 0821389.4

(51) Int. Cl.
*F16D 21/00* (2006.01)
*F16D 28/00* (2006.01)

(52) U.S. Cl.
USPC ........................................ 192/48.7; 192/48.2

(58) Field of Classification Search
USPC ......... 192/48.7, 48.2, 48.4, 48.5, 48.91, 84.6, 192/93 A; 74/30
See application file for complete search history.

(56) References Cited

U.S. PATENT DOCUMENTS

| 4,932,290 A | 6/1990 | Toyoda et al. |
| 5,197,780 A | 3/1993 | Coughlin |
| 5,826,462 A * | 10/1998 | Schaefer .................... 74/473.37 |
| 6,126,132 A | 10/2000 | Maue |
| 6,626,064 B1 | 9/2003 | Maue et al. |
| 2007/0227296 A1* | 10/2007 | Bordwell et al. ........... 74/665 G |
| 2009/0127057 A1* | 5/2009 | Inomori et al. ............ 192/70.18 |

FOREIGN PATENT DOCUMENTS

| DE | 3825020 A1 | 2/1989 |
| DE | 19932047 A1 | 1/2001 |
| WO | 2006008663 A1 | 1/2006 |
| WO | 2007060053 A1 | 5/2007 |

OTHER PUBLICATIONS

PCT Written Opinion of the International Searching Authority for PCT/GB2009/002665 dated May 24, 2011.

* cited by examiner

*Primary Examiner* — Rodney Bonck
*Assistant Examiner* — Stacey Fluhart
(74) *Attorney, Agent, or Firm* — Kaplan Breyer Schwarz & Ottesen, LLP; Harry K. Ahn, Esq.

(57) ABSTRACT

A transmission system for driving one or two of a plurality of drivable devices by a single drive motor including an input shaft (4) for connection to the drive motor, a plurality of output units, each output unit including a drive member (6), which is drivable by the input shaft (4), an output shaft (16) and a clutch mechanism (8,18). A clutch engagement actuator (30) is arranged to act on a selected one of the clutch mechanisms (8, 18) to connect the input shaft (4) to the associated output shaft (16). The drive members (6) are carried on a common drive shaft (2) and are rotatable with respect to it. The clutch mechanisms (8,18) are operable to selectively connect the drive member (6) to the drive shaft (2) to rotate with it.

13 Claims, 4 Drawing Sheets

MULTIPLE OUTPUT TRANSMISSION SYSTEMS

CROSS REFERENCE TO RELATED APPLICATIONS

This application is a national phase of PCT application No. PCT/GB2009/002665, filed Nov. 13, 2009, which claims priority to GB patent application No. 0821389.4, filed Nov. 21, 2008, all of which are incorporated herein by reference.

The present invention relates to multiple output transmission systems, that is to say transmission systems with a single input shaft and a plurality of output shafts, each of which may be selectively coupled to be rotated by the input shaft. More specifically, the invention relates to a transmission system for driving a selected one or two of a plurality of drivable devices by a single drive motor including an input shaft for connection to the drive motor, a plurality of output units, each output unit including a drive member which is drivable by the input shaft, an output shaft and a clutch mechanism, and a clutch engagement actuator arranged to act on a selected one of the clutch mechanisms to connect the input shaft to the associated output shaft, thereby transmitting rotation from the input shaft to the said output shaft.

Such transmission systems have a number of applications, particularly in the automotive field. It is common for automotive seats to be provided with a number of dedicated actuators for adjusting the height, position and degree of recline of the seat, as well as headrest, armrest, lumbar and lateral restraint adjustment. In some cases, two actuators are provided for a single adjustment, e.g. one actuator on each side of the seat for adjusting its position or height. It would of course be possible for each actuator to include a respective electric motor but this is highly undesirable as regards cost and weight and due to the fact that space is at a premium within and below automotive seats. It is therefore known to provide each actuator in the form of an unpowered device which may be selectively connected to a single electric drive motor. The user need simply select the setting which is to be adjusted and the motor is then connected automatically to the desired actuator or actuators and then operated to effect the desired adjustment. A further application for such transmission systems is in automotive door actuators. Thus a single motor coupled to a transmission system may be accommodated in a vehicle door and used selectively to operate one of for instance, a powered wing mirror, a powered window and a powered door lock.

A transmission system of the type referred to is disclosed in WO2006/008663. In this known transmission system the drive members constitute gear wheels, each of which is in mesh with one or more of the other gear wheels and one of which is connected to be rotated by the drive motor. When the drive motor is actuated, all of the gear wheels are rotated, notwithstanding the fact that only one of them is to be connected by the associated clutch to the associated output shaft. Quite apart from the fact that this consumes an unnecessarily large amount of power, the fact that all of the gear wheels are rotated whenever the drive motor is actuated means that the transmission system is relatively noisy and such noise generation is frequently unacceptable in close proximity to the occupants of a passenger-carrying motor vehicle. The noise generation of the gear wheels in the transmission system of the prior document is further exacerbated by the fact that the gear wheels are spur gear type, which is inherently relatively noisy. Furthermore, the clutch mechanisms used in the prior documents are extremely complex and have a large number of parts and this means that they are expensive to manufacture. Additionally, the fact that the clutch mechanisms are arranged axially concentric with the drive output means that each output unit necessarily only has a single output shaft.

It is therefore the object of the present invention to provide a transmission system of the type referred to above which inherently operates significantly more quietly than known transmission systems. A further object of the invention is to provide such a transmission system in which the clutch mechanisms have a significantly reduced part count, overall weight, and are thus simpler and cheaper.

Accordingly to the present invention, a transmission system of the type referred to above is characterised in that the drive members are carried on a common drive shaft and are rotatable with respect to it and that the clutch mechanisms are operable to selectively connect the drive members to the drive shaft to rotate with it.

Thus in the transmission of the prior cited document, the drive members are all permanently connected to the drive shaft and thus all rotate when the drive shaft rotates. The clutch mechanisms are selectively operable to connect the drive members to the associated output shafts. In the transmission of the present invention, by contrast, the drive members are permanently connected to the associated output shafts and the clutch mechanisms are operable to selectively connect the drive members to the drive shaft. This means that when the drive shaft is rotated, all of the drive members initially remain stationary because they are rotatable with respect to the drive shaft. When the clutch engagement actuator is operated to cause one of the clutch mechanisms to engage, only one of the drive members is connected to the drive shaft to rotate with it whilst the others continue to remain stationary. Less power is therefore consumed and substantially less noise is generated.

In the preferred embodiment, each clutch mechanism includes a first portion carried by the associated drive member and a second portion which is mounted to rotate about the axis of the drive shaft and is movable longitudinally along the shaft by a clutch engagement actuator between an engaged position, in which the first and the second portions of the clutch are in engagement and the associated drive member therefore rotates with the drive shaft, and a disengaged position in which the two portions of the clutch mechanism are not in engagement. The second portion of each clutch mechanism may be connected to the drive shaft to rotate with it in a number of different ways but in one simple embodiment the drive shaft has a number of portions of non-circular cross section spaced apart along its length, each of which carries a respective second portion of a clutch mechanism, which has an opening formed in it whose shape corresponds to that of the associated portion of the drive shaft. The complementary non-circular shape of the apertures in the second portions of the clutch mechanisms and of the portions of the drive shaft ensure that the second portions of the clutch mechanisms are keyed to and thus rotate with the drive shaft but may move longitudinally along it. The drive shaft may carry the drive members and the portions of the drive shaft between the portions of non-circular cross-section may be circular, to permit rotation about them of the drive members. However, the portions of the drive shaft around which the drive members extend could also be of non-circular shape and carry circular bearings on which the drive members are rotatably supported.

It is, however, preferred that the transmission system includes an outer housing and that the drive members are supported for rotation by bearings which are fixed to the housing. In this event, the drive shaft is preferably of constant cross-section along its entire length. It will be appreciated that in this embodiment there will be no direct or indirect contact between the drive members and the drive shaft.

Whilst the clutch mechanisms may be of friction type, it is preferred that they are of positive engagement type. Positive engagement clutches, e.g. dog clutches, are not only cheaper than friction clutches but require less maintenance.

In the preferred embodiment, the clutch engagement actuator is connected to a rotary clutch shaft, which carries one or more actuating members cooperating with a respective second portion of the clutch mechanisms, each actuating member being so constructed that as the clutch shaft rotates the clutch mechanisms are engaged and disengaged sequentially. Thus in this embodiment there is a rotary clutch shaft, which in practice will be parallel to the drive shaft, which carries a number of actuating members. The actuating members are so shaped and engage the second portions of the clutch mechanisms or otherwise cooperate with them such that as the clutch shaft is rotated each clutch mechanism is engaged and then disengaged and the actuating members are so arranged that only one clutch mechanism is engaged at only one time.

Each clutch actuating member may be a continuous element in the form of a disc or it may be apertured or constituted by a bent portion of wire or thin rod of any appropriate cross-sectional shape. The actuating members may be made of plastic, metal or of composite material.

The actuating members may take many forms but it is preferred that they are connected to the clutch shaft and extend generally radially from it and that they include a portion which is offset from the remainder of the actuating member in the direction of the axis of the clutch shaft. If, as is preferred, the clutch mechanisms are of positive engagement type, it is of course possible that when an actuating member attempts to move the associated second portion of a clutch mechanism in the direction of the axis of the clutch shaft, the two portions of the clutch mechanism are in relative positions which will not permit engagement of the clutch mechanism. In order to avoid the actuating member being broken or otherwise damaged by its inability to move the associated second clutch portion into full engagement with the first clutch portion, it is preferred that each actuating member is resiliently deformable in the direction of the axis of the clutch shaft. This means that if the two clutch portions cannot be fully engaged initially, the actuating member will be deformed resiliently and will exert a biasing force onto the second clutch portion tending to move it into engagement with the associated first clutch portion. As soon as relative rotation of the two clutch portions commences, they will rapidly move into a position in which engagement is possible and the biasing force exerted by the actuating member will then ensure that engagement incurs immediately.

Whilst it is possible for the number of actuating members to be equal to the number of clutch mechanisms, this is not in fact necessary and in the preferred embodiment the second portions of the clutch members of at least one pair of adjacent output units are connected together to form a clutch unit which cooperates with a single actuating member, which includes two portions which are offset in opposite directions from the remainder of the actuating member in the direction of the axis of the clutch shaft, which two portions are offset from one another in the circumferential direction of the actuating member. In this embodiment, rotation of the clutch shaft and thus of the actuating member will result in one of the offset portions on the actuating member moving the clutch unit in a first direction along the axis of the shaft to cause one clutch mechanism to engage and continued rotation of the clutch shaft will result in that clutch mechanism subsequently becoming disengaged and in the second offset portion of the actuating member subsequently causing the clutch unit to move in the other direction along the clutch shaft, thereby causing the other clutch mechanism to become engaged. This means that in the event that there are four output units, there will be two clutch units, each of which constitutes the second portion of two clutch mechanisms and cooperates with a single actuating member, whereby there are only two actuating members and not four.

As mentioned above, it is preferred that the clutch mechanisms are of positive engagement or dog clutch type and in the preferred embodiment the first and the second portions of each clutch mechanism are of castellated construction affording projections and recesses, the projections on each portion engaging in the recesses in the other portion, when the clutch mechanism is engaged.

The drive members of the transmission system may take many forms and could be, for instance, spur gears or bevel gears. It is, however, preferred that they are worm gears in mesh with respective output worm gears which are connected to rotate with respective output shafts. Worm gears are preferred because of their low noise generation characteristics. A further reason why worm gears are preferred is that it is preferable for the output shafts to extend perpendicular to the drive shaft and the clutch shaft and worm gears represent a cheaper way of converting rotary drive in one direction to rotary drive in a direction at right angles thereto than using bevel gears. Whilst each output worm gear may be connected to rotate with only a single output shaft, it is preferred that it is in fact connected to rotate with two respective output shafts, whereby each output unit may power two separate drive mechanisms. This is of particular value with automotive seat adjustors since it is common for such adjustors to be provided in pairs, that is to say one on each side of the seat.

The use of worm or helical gears also provides the possibility of using differing gear ratios within a very compact arrangement for adjustments requiring different speeds of actuation. Many applications, especially seat adjustment, have additional dedicated reduction ratio gearboxes at the point of connection to the seat mechanism and this additional gearbox may be simplified as a result of the use of reduction ratios by means of meshing worm gears within the transmission system.

Further features and details of the invention will be apparent from the following description of one specific embodiment which is given by way of example only with reference to the accompanying drawings in which.

Figure 3:
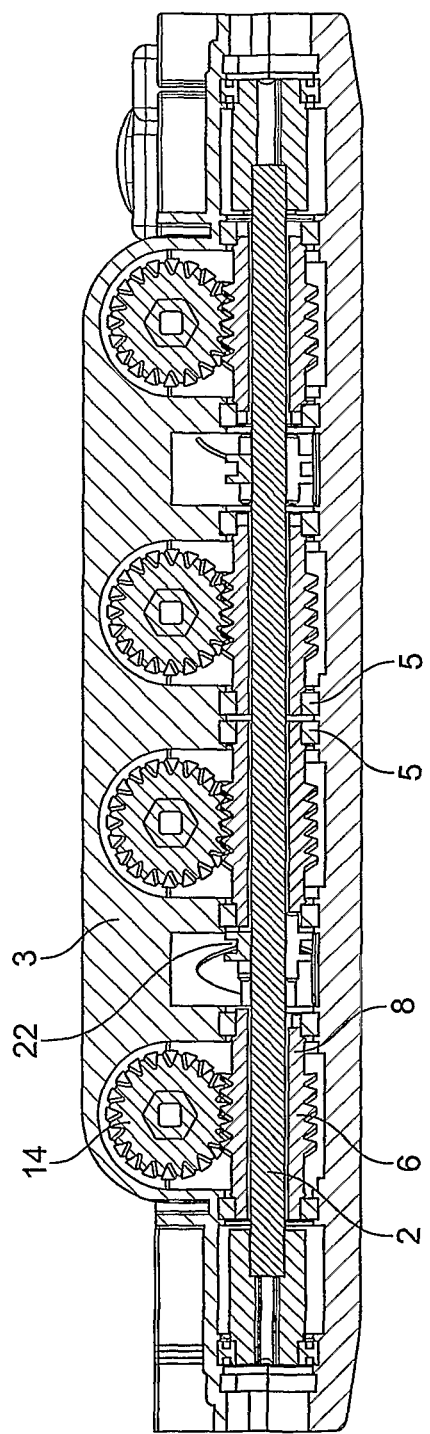
FIG. 3 is a vertical sectional view of the transmission system of FIGS. 1 and 2, additionally showing the outer housing.
Figure 4:
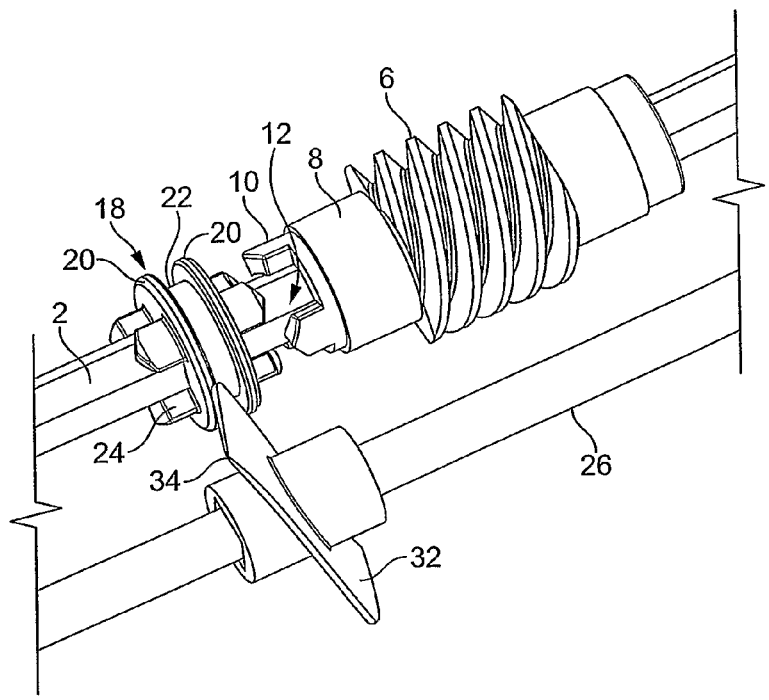
FIGS. 4 and 5 are perspective views showing only a single drive gear and the associated clutch mechanism and actuating member in the disengaged and engaged positions only.
Figure 5:
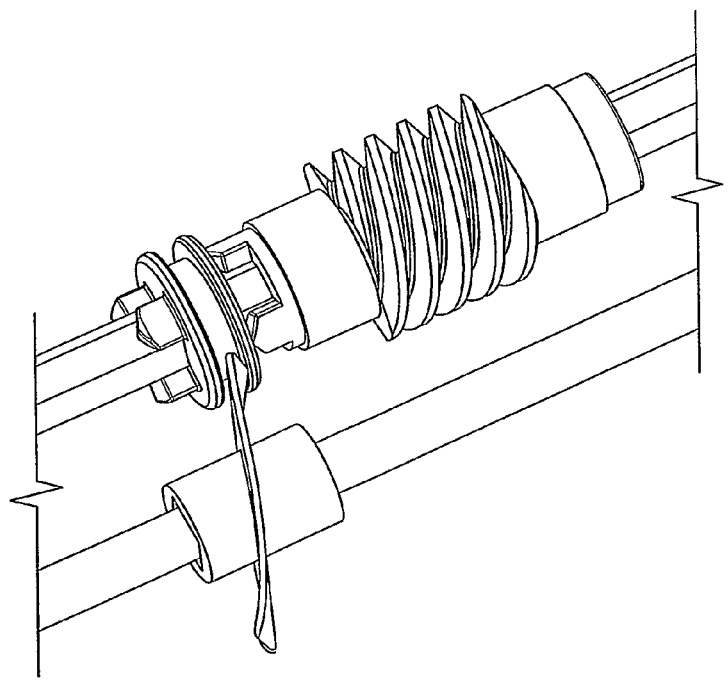

The transmission system includes a drive shaft 2, which is connected at each end to an input shaft 4, only one of which will be used in any particular application. The drive shaft is of constant non-circular section, e.g. of hexagon shape, over its entire length. Connected to the outer housing 3 of the transmission system, which may be seen in FIG. 3, are four spaced pairs of bearings 5, which extend around the drive shaft 2. Each spaced pair of bearings 5 rotatably supports a drive gear 6 of worm gear type. Each worm gear 6 is thus supported for rotation about the drive shaft 2 but is not in contact with it. At one end of each worm gear 6 is a sleeve 8 whose free end is castellated and thus affords a number of projections 10 extending in the axial direction, between which are recesses 12. In mesh with each drive gear 6 is an output worm gear 14, which is mounted to rotate about an axis perpendicular to that of the drive shaft 2. Connected to each end of each output gear 14 is a respective output shaft 16.

Figure 1:
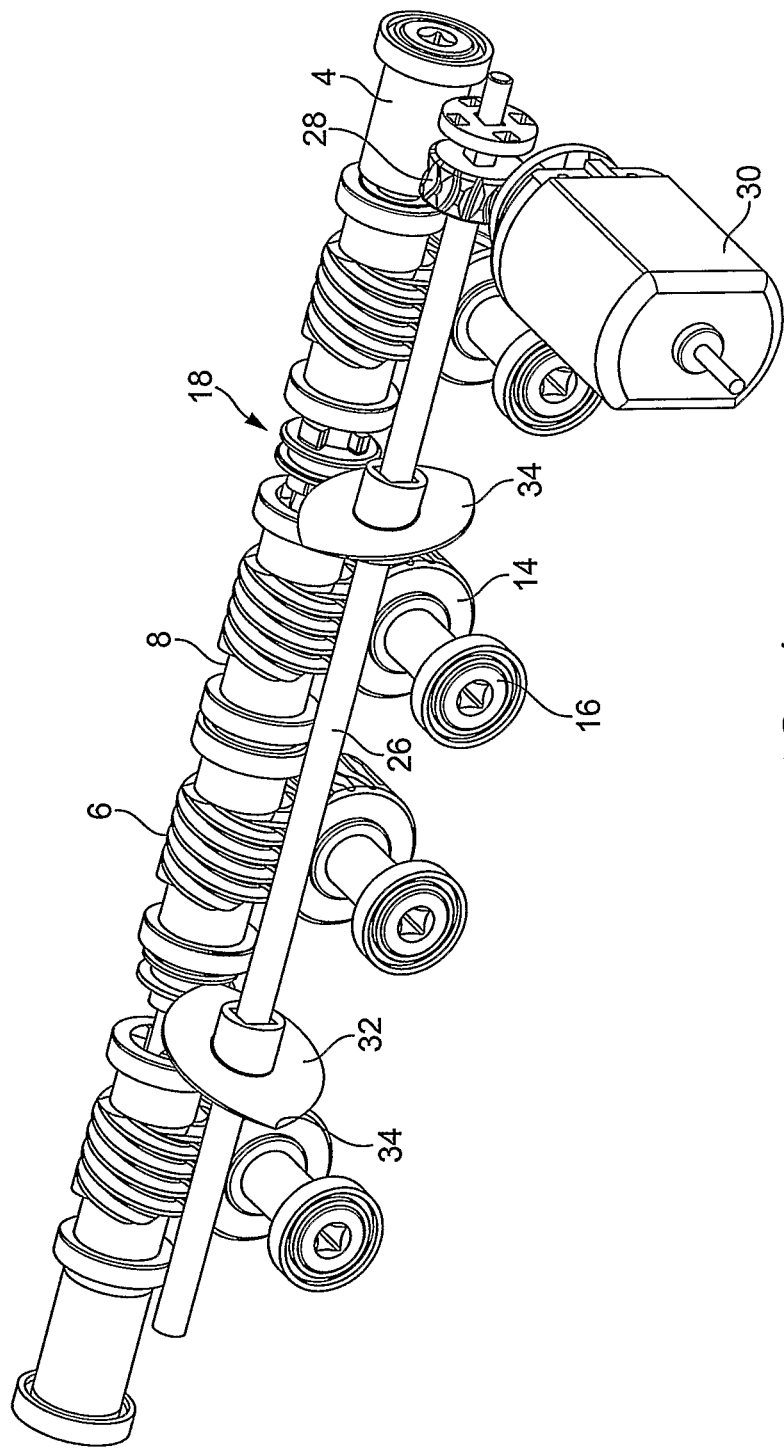
FIG. 1 is a perspective view of a transmission system in accordance with the present invention of a transmission system in accordance with the present invention, from which the outer housing has been omitted for the sake of clarity.
Figure 2:
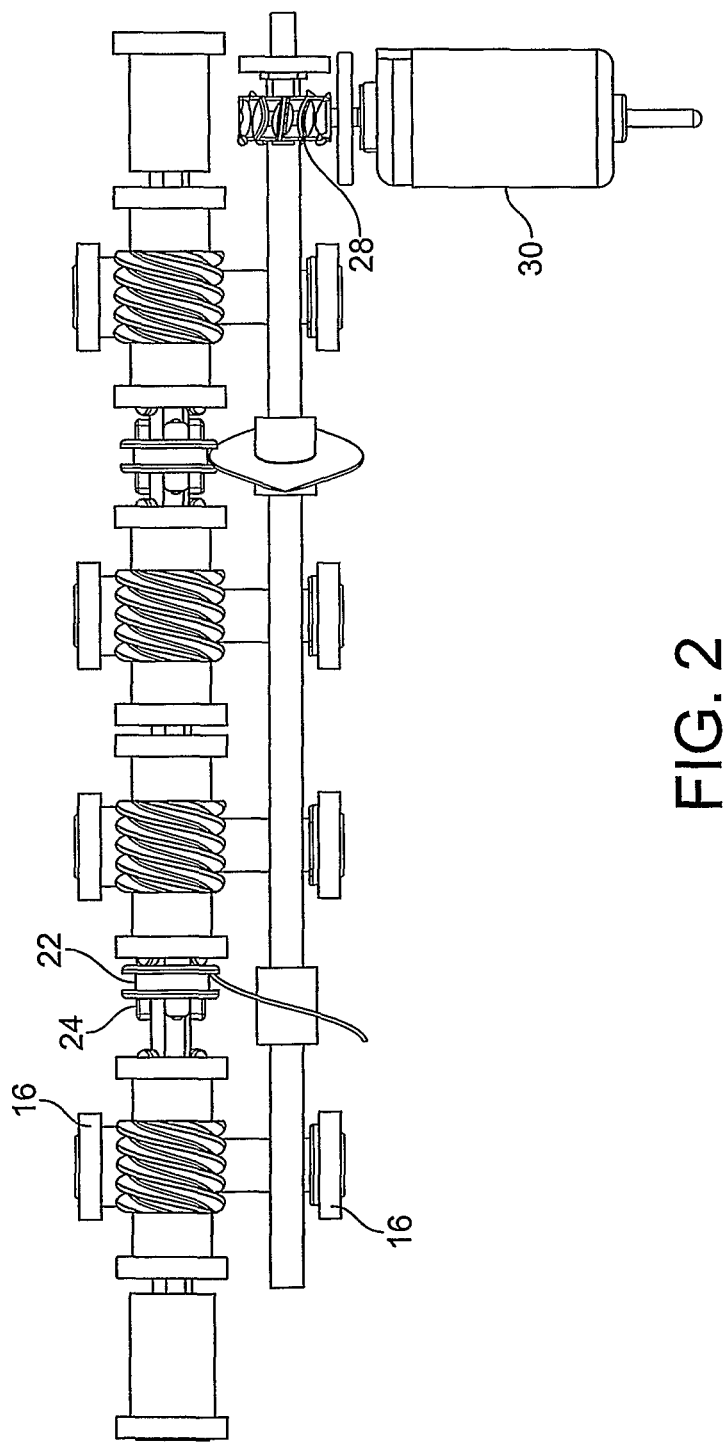
FIG. 2 is a plan view of the transmission system of FIG. 1.

There are thus four drive gears 6 in the illustrated embodiment, though it will be appreciated that there may be any desired number of such drive gears and that their number is dictated solely by the number of actuators which are to be operated. Slidably received on the portions of the drive shaft 2 situated between the two drive gears 6 on the left in FIG. 1 and the two drive gears 6 on the right in FIG. 1 are respective clutch engagement units 18. Each clutch engagement unit affords a central aperture of hexagonal shape, which matches the hexagonal shape of the drive shaft. The clutch engagement units 18 are thus constrained to rotate with the drive shaft 2. Each clutch engagement unit 18 includes two spaced radially extending flanges 20, between which is defined an annular recess 22. Projecting longitudinally from the outer surface of each flange 20 is a number of axial projections 24, the shape, size and arrangement of which correspond to those of the recesses 12 formed in the end surface of the adjacent sleeve 8.

Extending parallel to the drive shaft 2 is a clutch actuation shaft 26. This is connected by gearing 28 of any desired type to a clutch actuation motor 30. Carried by the clutch shaft 26 so as to rotate with it are two spaced actuating members 32. Each of these is constituted by a generally radially extending substantially circular disk, the outer portion of which includes a portion 34 which is offset from the remainder of the disk in one direction parallel to the length of the clutch shaft 26. Diametrically opposed to that offset portion 34 is a further similar offset portion 34, which is offset in the opposite longitudinal direction. The two offset portions 34 on each actuating disk 32 are offset from one another by 180 degrees and the offset portions 34 on one actuating disk 32 are offset from those on the other actuating disk 32 by 90 degrees. Each actuating disk 32 is made of nylon or some other tough but yet resilient material. The outer edges of the two actuating disks 32 are received in the annular recess 22 of a respective clutch engagement unit 18. The magnitude of the longitudinal offset of the offset portions 34 is so sized with respect to the dimensions of the clutch mechanisms that when the clutch motor 30 is actuated so as to rotate the clutch shaft 26, each clutch engagement unit 18 is moved sequentially by the offset portions 34 from a central position between the two drive gears 6 between which it is located to a position to the left and then back to the central position and then to a position to the right and then back to the central position again. Due to the fact that the four offset portions 34 are equiangularly offset from one another by 90 degrees, as the clutch shaft 26 is rotated through a single revolution only one of the clutch engagement units will be displaced from the central position at any one time and the displacement of the two units will occur alternately, firstly to the left and then to the right.

In use, a drive motor (not shown) will be connected to one of the input shafts 4. When the drive motor is actuated, the drive shaft will be caused to rotate about its axis and since the drive gears 6 are rotatably carried by bearings supported on the housing 3, the drive shaft will rotate with respect to the drive gears which will thus remain substantially stationary. The output shafts 16 will be connected to respective actuators, e.g. the actuators of an adjustable vehicle seat. If it is desired to actuate one or more actuators connected to one or two of the output shafts 16 associated with one of the output gears 14, a control signal is sent to the clutch actuation motor 30 which then rotates the clutch shaft 26 to the desired angular position. The clutch shaft is rotated until the offset portion 34 on the actuation disk 32 associated with the drive gear 6 reaches a position in which it has longitudinally displaced the associated clutch engagement unit towards the associated drive gear 6. As the clutch engagement unit 18 moves towards the associated drive gear 6, the projections 24 on one side of it move into the recesses 12 in the end of the associated sleeve 8. As this occurs, the clutch engagement unit 18, which is of course constrained to rotate with the drive shaft 2, becomes rotationally locked with the sleeve 8 and drive gear 6 and the drive gear 6 thus begins to rotate. This rotation is transmitted to the associated output gear 14 and thus to the associated output shafts 16, whereby the actuator or actuators connected to those output shafts are caused to rotate to produce the desired movement of e.g. the vehicle seat to which they are fitted. When the desired adjustment has been completed, e.g. as indicated by a feed back signal to the actuator, a further signal is sent to the clutch motor 30 which then rotates the clutch shaft 26 to a position in which both the clutch engagement units 18 are substantially in a central position between the associated pairs of drive gears 6. If the clutch engagement unit 18 is positioned with respect to the associated sleeve 8 such that, when it is moved towards the sleeve 8, one of the sets of projections 24 on it engage the projections 10 on the sleeve 8, longitudinal movement of the clutch engagement unit 18 may be initially prevented. For this reason, the free ends of the projections 10 and 24 are constituted by two oppositely inclined surfaces. If, during movement of a clutch engagement unit 18 towards a sleeve 8, the inclined surface on the projections 24 should come into engagement with inclined surfaces on the projections 10, the camming action created by the engagement of these surfaces will result in relative rotation of the sleeve 8 and the associated drive gears 6 about the axis of the drive shaft 2 until the projections 24 are able to slide into the recesses 12 and the drive gear 6 is then rotationally locked to the clutch engagement unit 18 and thus to the drive shaft 2. The resilience in the longitudinal direction of the actuating disk 32 will result in the longitudinal force applied to the clutch engagement unit 18 increasing progressively as the clutch actuating disk 32 is rotated into the desired position and thus results in a progressive angular alignment of the projections 24 on the clutch engagement unit 18 with the recesses 12 in the sleeve 8 and will result also in no damage occurring to the clutch actuating disk 32. Whilst the rotation of the drive shaft 2 could be commenced before one of the clutch mechanisms have been engaged, it is likely in practice that the clutch motor 30 will be actuated and one of the clutches engaged before operation of the drive motor is commenced. It will be appreciated that each clutch mechanism incorporates a first portion which forms part of the sleeve 8, and a second portion which falls part of a clutch engagement unit 18. It will also be appreciated that, in the embodiment described above, each clutch engagement unit 18 constitutes the second portion of two clutch mechanisms connected back to back. It would, however, also be possible for each second clutch portion to be wholly separate and in this event each second clutch portion would cooperate with a respective clutch actuation member carried by the clutch shaft 26. In the present case, this would mean that there would then be four clutch actuation members but each of them would then have only a single offset portion and not two but the offset portions on the four clutch actuation members would again be substantially equiangularly offset from one another.

For the purpose of easily controlling the transmission system, the shaft of the clutch actuation motor 30 may conveniently carry a multi-pole ring magnet or a ring or disc with a number of magnets embedded in it co-operating with a Reed switch or Hall effect sensor or some other suitable electrical or electronic component or device capable of closing a circuit or creating an electrical signal. The signals produced may be processed to calculate the angular positions of the various clutch actuating members. Similarly, the clutch shaft 26 may carry one or more magnets co-operating with a Reed switch or Hall effect sensor or another suitable device capable of closing a circuit or creating an electronic signal. The signals produced may be processed to enable the position of the clutch shaft to be determined when the clutch actuation motor is energised.

Whilst the clutch actuation members in the illustrated embodiment comprise disks with one or more portions of their outer periphery offset in the direction of the length of the clutch shaft, it will be appreciated that these actuation members may take many forms and all that is necessary is that they are so shaped and cooperate with the second portions of the clutch mechanisms such that rotation of the clutch shaft will result in sequential engagement of the clutch mechanisms.

The invention claimed is:

1. A transmission system for driving a selected one or two of a plurality of drivable devices by a single drive motor including an input shaft for connection to the drive motor, a plurality of output units, each output unit including a drive member which is drivable by the input shaft, an output shaft and a clutch mechanism, and a clutch engagement actuator arranged to act on a selected one of the clutch mechanisms to connect the input shaft to the associated output shaft, wherein the drive members are carried on a common drive shaft and are rotatable with respect to it, each clutch mechanism includes a first portion carried by the associated drive member and a second portion which is mounted to rotate about the axis of the drive shaft and is movable longitudinally along the drive shaft by the clutch engagement actuator between an engaged position, in which the first and second portions of the clutch mechanisms are in engagement and the associated drive member rotates with the drive shaft, and a disengaged position, the clutch engagement actuator is connected to a rotary clutch shaft which carries one or more actuating members cooperating with a respective second portion of the clutch mechanisms, and each actuating member is so constructed that as the clutch shaft rotates the clutch mechanisms are engaged and disengaged sequentially, characterised in that each actuating member extends generally radially from the clutch shaft and includes a portion which is offset from the remainder of the actuating member in the direction of the length of the clutch shaft, wherein the second portions of the clutch members of at least one pair of adjacent output units are connected together to form a unit in which at least two of the one or more actuating members constitute a single actuating member which includes two portions which are offset in opposite directions from the remainder of the actuating member in the direction of the length of the clutch shaft, which two portions are offset from one another in the circumferential direction of the actuating member.

2. A system as claimed in claim 1 in which the drive members are supported for rotation about the axis of the input shaft by respective bearings.

3. A system as claimed in claim 2 which includes an outer housing and the bearings are fixed to the housing.

4. A system as claimed in claim 1 in which the clutch mechanisms are of positive engagement type.

5. A system as claimed in claim 1 in which the clutch mechanisms are of positive engagement type and each actuating member is resiliently deformable in the direction of the length of the clutch shaft.

6. A system as claimed in claim 4 in which the first and second portions of each clutch mechanisms are of castellated construction having projections and recesses, the projections on each portion engaging in the recesses in the other portion, when the clutch mechanism is engaged.

7. A system as claimed in claim 1 where in the power transmission ratio from the input shaft to any one of the output shafts is a one-to-one ratio.

8. A system as claimed in claim 1 wherein the power transmission ratio varies from one of the output shafts to another.

9. A system as claimed in claim 1 wherein at least one of the output shafts is coupled with a gear box.

10. A system as claimed in claim 1 wherein at least one of the output shafts is further coupled directly with a at least one other output shaft such that from the same engaged output a simultaneous reverse rotation output can be provided.

11. A system as claimed in claim 1 wherein at least one of the output shafts is further coupled indirectly with a at least one other output shaft such that when the clutch mechanism for the at least one output shaft is in the engaged position, an additional same direction rotation output can be provided.

12. A system as claimed in claim 1 wherein incorporated within the housing are control electronics for controlling the said system and interfacing with external control means.

13. A system as claimed in claim 1 in which the drive members are worm gears, which are in mesh with respective output worm gears which are connected to rotate with respective output shafts.

* * * * *